US012052589B2

(12) United States Patent
Vera Nadales et al.

(10) Patent No.: US 12,052,589 B2
(45) Date of Patent: Jul. 30, 2024

(54) METHOD AND NETWORK NODE FOR PROVIDING AN RF MODEL OF A TELECOMMUNICATIONS SYSTEM

(71) Applicant: Telefonaktiebolaget LM Ericsson (publ), Stockholm (SE)

(72) Inventors: Ma Josefa Vera Nadales, Campanillas (ES); Omar Kaddoura Marin, Campanillas (ES); Adriano Mendo Mateo, Campanillas (ES)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 1648 days.

(21) Appl. No.: 16/302,192

(22) PCT Filed: May 25, 2016

(86) PCT No.: PCT/EP2016/061821
§ 371 (c)(1),
(2) Date: May 7, 2019

(87) PCT Pub. No.: WO2017/202463
PCT Pub. Date: Nov. 30, 2017

(65) Prior Publication Data
US 2023/0066921 A1    Mar. 2, 2023

(51) Int. Cl.
*H04W 24/08*    (2009.01)
*H04B 17/318*    (2015.01)
*H04B 17/336*    (2015.01)

(52) U.S. Cl.
CPC .......... *H04W 24/08* (2013.01); *H04B 17/318* (2015.01); *H04B 17/336* (2015.01)

(58) Field of Classification Search
CPC .... H04W 24/08; H04W 24/00; H04B 17/318; H04B 17/336
See application file for complete search history.

(56) References Cited

U.S. PATENT DOCUMENTS 8,385,908 B2    2/2013    Medina et al.
2002/0123341 A1    9/2002    Iyer
(Continued)

OTHER PUBLICATIONS

ETSI TS 136 331 V.12.8.0; Technical Specification; LTE; Evolved Universal Terrestrial Radio Access (E-UTRA): Radio Resource Control (RRC); Protocol specification (3GPP TS 36.331 version 12.8.0 Release 12)—Jan. 2016.
(Continued)

*Primary Examiner* — Peter P Chau
(74) *Attorney, Agent, or Firm* — Weisberg I.P. Law, P.A.

(57) ABSTRACT

A method and a network node (110) for providing an RF model of a telecommunications system (100) are disclosed. The network node (110) configures (A030) reporting of call traces indicative of: a first type of measurement event relating to serving cell with a first time-to-trigger value and a first threshold value, and a second type of measurement event relating to neighbouring cells with respect to the serving cell with a second time-to-trigger value and a second threshold value, wherein the first time-to-trigger value is greater than the second time-to-trigger value. The network node (110) receives (A090) a respective call trace representing a firstly reported measurement event of the first or second type for a connection in said each cell. Moreover, the network node (110) processes (A100) the respective call trace to extract an Reference Signal Received Power "RSRP" or to extract a Carrier-To-Interferer ratio "C/I". Next, the network node (110) forms (A110, A120) a first distribution of RSRP and a second distribution of C/I, representing an RF model. The RF model is fed to a network management tool (140) for managing performance of the telecommunications system (100). A corresponding computer program and a carrier therefor are also disclosed.

13 Claims, 12 Drawing Sheets

(56) References Cited

U.S. PATENT DOCUMENTS

2015/0319626 A1 11/2015 Yi et al.
2016/0323754 A1* 11/2016 Friday .................. H04W 16/28

OTHER PUBLICATIONS

International Search Report for International application No. PCT/EP2016/061821—Mar. 7, 2017.

* cited by examiner

METHOD AND NETWORK NODE FOR PROVIDING AN RF MODEL OF A TELECOMMUNICATIONS SYSTEM

PRIORITY

This nonprovisional application is a U.S. National Stage Filing under 35 U.S.C. § 371 of International Patent Application Serial No. PCT/EP2016/061821 filed May 25, 2016, and entitled "Method and Network Node for Providing an RF Model of a Telecommunications System" which is hereby incorporated by reference in its entirety.

TECHNICAL FIELD

Embodiments herein relate to wireless communication systems, such as telecommunication system. In particular, a method and a network node for providing an RF model of a telecommunications system are disclosed. A corresponding computer program and a carrier therefor are also disclosed.

BACKGROUND

Many wireless communication systems can be optimized by configuring, or tuning, various parameters, depending on radio conditions in the environment in which a network is installed. The radio conditions are typically represented by a so called RF model. The RF model can be achieved by means of measurements performed during so called drive tests. The drive tests are usually performed by that e.g. a vehicle equipped with radio measurement equipment drives around in the environment and performs measurements on radio signals from the network. Thus, the RF model is filled with data corresponding to radio conditions for a current configuration of the network. The RF model can then be feed into a network optimization tool, such as Ericsson Cell Optimizer (ECO), in order to tune the various parameters of the network and thereby provide an updated configuration for the network. Thereafter, the updated configuration is applied to the network. The various parameters include e.g. electrical tilts, mechanical tilts, azimuths, antenna heights, antenna models, number of cells, transmit power levels and the like.

However, the drive tests may be time consuming and therefore also costly. It has consequently been found that use of data obtained by an Operations Support Systems (OSS), instead of data from the drive tests, to build the RF model is beneficial. A reason for this is that no or few drive tests will be required and the requisite information to build the RF module is gathered during operation of the network. The data obtained by the OSS is typically referred to as call traces. In particular, in environments covering a larger area than one covered by the drive tests, use of call traces to build the RF model is advantageous.

The call traces include reports of Radio Resource Control (RRC) measurements. The RRC measurements, specified in 3rd Generation Partnership Project (3GPP) Technical Specification (TS) 36.331 include event-triggered as well as periodical measurement reports to the eNodeB. However, vendor equipment, such as a base station, an eNodeB and the like, is not required to implement all RRC measurements, i.e. some measurements are mandatory while other measurement are optional. Moreover, even if all RRC measurement are implemented by the vendor equipment, all RRC measurements are not required to be reported in the call traces to e.g. the OSS.

Now returning to ECO, the RF model provided thereto is typically build up from call traces including periodical measurement reports. The vendor equipment may not always provide call traces including periodical measurement reports. Disadvantageously, applicability of ECO is limited to vendor equipment that provides periodical measurement reports in the call traces.

SUMMARY

An object may thus be to build an RF model, to be feed to a network management tool, such as ECO, in a manner that is more flexible with respect to requirements of measurements reported in call traces.

According to an aspect, the object is achieved by a method, performed by a network node, for providing a Radio Frequency, RF, model of a telecommunications system, wherein the telecommunications system comprises cells. The network node configures, for at least a set of the cells, reporting of call traces indicative of a first type of measurement event relating to serving cell with a first time-to-trigger value and a first threshold value, and a second type of measurement event relating to neighbouring cells with respect to the serving cell with a second time-to-trigger value and a second threshold value, wherein the first time-to-trigger value is greater than the second time-to-trigger value. The network node receives, from each cell of the set, a respective call trace representing a firstly reported measurement event of the first or second type for a connection in said each cell.

Moreover, the network node processes, for said each cell of the set, the respective call trace to extract an Reference Signal Received Power "RSRP" for said each cell of the set or to extract a Carrier-To-Interferer ratio "C/I" for said each cell of the set with respect to an interfering neighbouring cell. The network node forms a first distribution of RSRP based on the extracted RSRP for said each cell of the set. The network node forms a second distribution of C/I based on the extracted C/I, wherein the first and second distributions represent an RF model. The network node sends the RF model to a network management tool for managing performance of the telecommunications system.

According to another aspect, the object is achieved by a network node configured for providing a Radio Frequency, RF, model of a telecommunications system, wherein the telecommunications system comprises cells. The network node is configured for configuring, for at least a set of the cells, reporting of call traces indicative of a first type of measurement event relating to serving cell with a first time-to-trigger value and a first threshold value, and a second type of measurement event relating to neighbouring cells with respect to the serving cell with a second time-to-trigger value and a second threshold value, wherein the first time-to-trigger value is greater than the second time-to-trigger value.

Moreover, the network node is configured for receiving, from each cell of the set, a respective call trace representing a firstly reported measurement event of the first or second type for a connection in said each cell. The network node is further configured for processing, for said each cell of the set, the respective call trace to extract an Reference Signal Received Power "RSRP" for said each cell of the set or to extract a Carrier-To-Interferer ratio "C/I" for said each cell of the set with respect to an interfering neighbouring cell.

Furthermore, the network node is configured for forming a first distribution of RSRP based on the extracted RSRP for said each cell of the set, and for forming a second distribution of C/I based on the extracted C/I, wherein the first and second distributions represents an RF model. The network node is also configured for sending the RF model to a network management tool for managing performance of the telecommunications system.

According to further aspects, the object is achieved by a computer program and a carrier therefor corresponding to the aspects above.

As used herein, the term "connection" refers to a part of a call, or session, during which the user equipment is connected to the same serving cell from attachment thereto to handover, or release, therefrom.

Thanks to that the first time-to-trigger value is greater than the second time-to-trigger value, it is ensured that the firstly reported measurement event is the second type of measurement in case entering conditions of first and second type of measurement event are fulfilled. The firstly reported measurement event relates to the connection associated with a user equipment reporting said firstly reported measurement event. As a next action, the RF model is represented by the first and second distributions formed based on the extracted RSRP and/or C/I using the firstly measurement event. In this manner, the RF module is generated without requiring periodical measurements to be reported in the respective call trace. As a result, a more flexible manner of generating the RF model is provided.

In summary, the embodiments herein provide for building of an Carrier-To-Interferer and RSRP distributions to represent an RF model used, for instance, in design and optimization tools, such as ECO, for network optimization purposes using intra-frequency event-triggered UE measurements provided in "RRC measurement report" messages instead of intra-frequency periodical UE measurements.

An advantage is hence that requirements of what information to be included in the call traces are low, e.g. since periodical measurements are not required.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Figure 1:
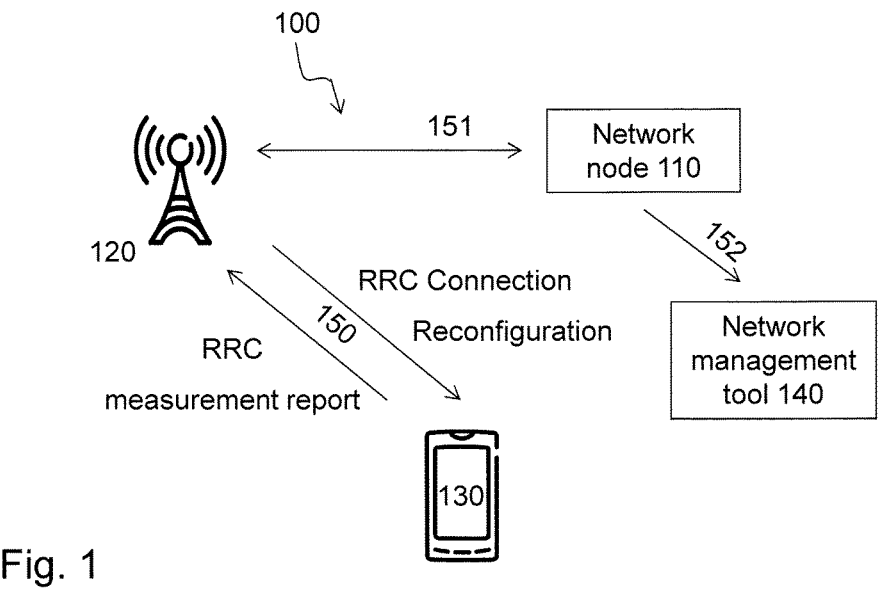
FIG. 1 is a schematic overview of an exemplifying telecommunications system in which embodiments herein may be implemented.

Throughout the following description similar reference numerals have been used to denote similar features, such as nodes, actions, steps, modules, circuits, parts, items elements, units or the like, when applicable. In the Figures, features that appear in some embodiments are indicated by dashed lines.

FIG. 1 depicts an exemplifying telecommunications system 100 in which embodiments herein may be implemented. In this example, the telecommunications system 100 comprises a Long Term Evolution (LTE) system.

In other examples, the telecommunications system 100 may comprise any cellular or wireless communication system, such as Universal Mobile Telecommunication System (UMTS) and Worldwide Interoperability for Microwave Access (WiMAX), Ultra-Mobile Broadband (UMB), Global System for Mobile communications (GSM) network, GSM/Enhanced Data Rate for GSM Evolution (EDGE) Radio Access Network (GERAN) network, EDGE network, a network comprising of any combination of Radio Access Technologies (RATs) such as e.g. Multi-Standard Radio (MSR) base stations, multi-RAT base stations etc., any 3rd Generation Partnership Project (3GPP) cellular network, WiFi networks, Worldwide Interoperability for Microwave Access (WiMax), 5th Generation (5G) system or any cellular network or system or the like.

The telecommunications system 100 comprises a network node 110, such as an Operation and Support System (OSS). As shown in FIG. 4 below, various alternative implementations are possible.

Furthermore, a cell 120, or radio network node, is shown in FIG. 1. The telecommunications system 100 may comprise the cell 120 and further cells (not shown). The cell may be referred to as an evolved Node B (eNB), a Radio Base Station (RBS), a Base Station System (BSS), a Radio Network Controller (RNC), a control node controlling one or more Remote Radio Units (RRUs), an access point or the like.

Moreover, the telecommunication system 100 may be said to comprise a user equipment 130. This means that the user equipment 130 is present in the telecommunication system 100. In particular, the user equipment 130 may be served by the cell 120. For simplicity of description, the user equipment 130 may represent one or more user equipments 130.

Additionally, FIG. 1 illustrates a network management tool 140, such as ECO, a Self-Organizing Network (SON) tool, or the like. The network management tool 140 may tune and/or configure various parameters of the telecommunications system 100 in order to improve performance thereof. As mentioned in the background section, the various parameters may include one or more of electrical tilts, mechanical tilts, azimuths, antenna heights, antenna models, number of cells, transmit power levels and the like. The performance may be improved in terms of one or more of:
    mobility, i.e. reducing handover failures,
    throughput, e.g. by reducing interference,
    number of dropped calls,
    improved coverage e.g. by increasing the number of users or the time served on LTE (in case the RF optimization is done in LTE network), and the like.

The cell 120 may communicate 150 with the user equipment 130. This communication may include user transmissions and/or control transmissions. The user transmissions may include user data, payload data, content data etc. The control transmissions may include control information relating to e.g. scheduling, authentication, mobility, power control, Radio Resource Control (RRC) etc. The user transmissions are only relevant in case the first wireless device is in a cellular mode. The communication may include uplink transmission and/or downlink transmission.

The cell 120 may also communicate 151 with the OSS 110. Typically, the cell 120 reports call traces indicative of measurement events to the OSS 110.

The OSS 110 may further communicate 152 with the network management tool 140. The network management tool 140 is typically fed with an RF model representing the telecommunications system 100.

As used herein, the term "user equipment" may refer to a wireless communication device, a machine-to-machine (M2M) device, a mobile phone, a cellular phone, a Personal Digital Assistant (PDA) equipped with radio communication capabilities, a smartphone, a laptop or personal computer (PC) equipped with an internal or external mobile broadband modem, a tablet PC with radio communication capabilities, a portable electronic radio communication device, a sensor device equipped with radio communication capabilities or the like. The sensor may be any kind of weather sensor, such as wind, temperature, air pressure, humidity etc. As further examples, the sensor may be a light sensor, an electronic or electric switch, a microphone, a loudspeaker, a camera sensor etc. The term "user" may indirectly refer to the wireless device. Sometimes, the term "user" may be used to refer to the user equipment or the like as above. It shall be understood that the user may not necessarily involve a human user. The term "user" may also refer to a machine, a software component or the like using certain functions, methods and similar.

Figure 2:
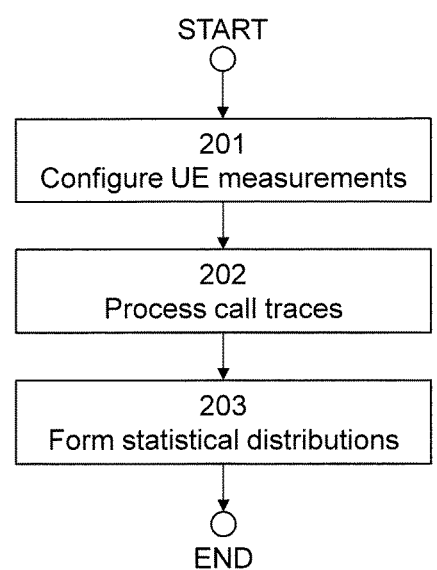
FIG. 2 is a flow chart illustrating actions of the network node.

Having the above described system overview in mind, a summary of the methods according to the embodiments herein is provided with reference to FIG. 2. The method includes three main stages, including one or more sub-stages or actions as elaborated with reference to FIG. 3. In a first stage 201, UE measurement reports available in the system are analyzed and/or configured for reporting in call traces. In a second stage 202, the call traces are processed. In a third stage 203, the statistical distributions, which represent the RF model, are built.

The RF model is built for a purpose of network design and optimization. The RF model is represented by RSRP and C/I distributions extracted from the call traces reporting event-triggered UE measurements, such as provided in RRC measurement report messages as standardized by Third Generation Partnership Project (3GPP), instead of periodical UE measurements. It may here be mentioned that Carrier-To-Interferer is typically defined as RSRP_carrier-RSRP_Interferer.

What information that is reported in the call traces is dependent on implementation of the cell 120, i.e. the call traces are vendor-specific with respect to the cell 120. For the embodiments herein, the call traces are assumed to include reports indicative of one or more of:
 a first type of measurement event relating to serving cell with a first time-to-trigger value and a first threshold value, and
 a second type of measurement event relating to neighbouring cells with respect to the serving cell with a second time-to-trigger value and a second threshold value, wherein the first time-to-trigger value is greater than the second time-to-trigger value.

Thus, certain minimum requirements on the cell 120 and/or the user equipment 130 may apply.

In case of LTE, the first type of measurement event may be a measurement event A2 and the second type of measurement event may be a measurement event A3 or a measurement event A4 or a measurement event A5.

According to the embodiments herein, the network node 110 and a method therein thus provide the RF model for performing physical parameters optimization based on event-triggered UE measurements collected from a live or offline system that does not require prior knowledge of the system configuration or the environment conditions.

Figure 3:
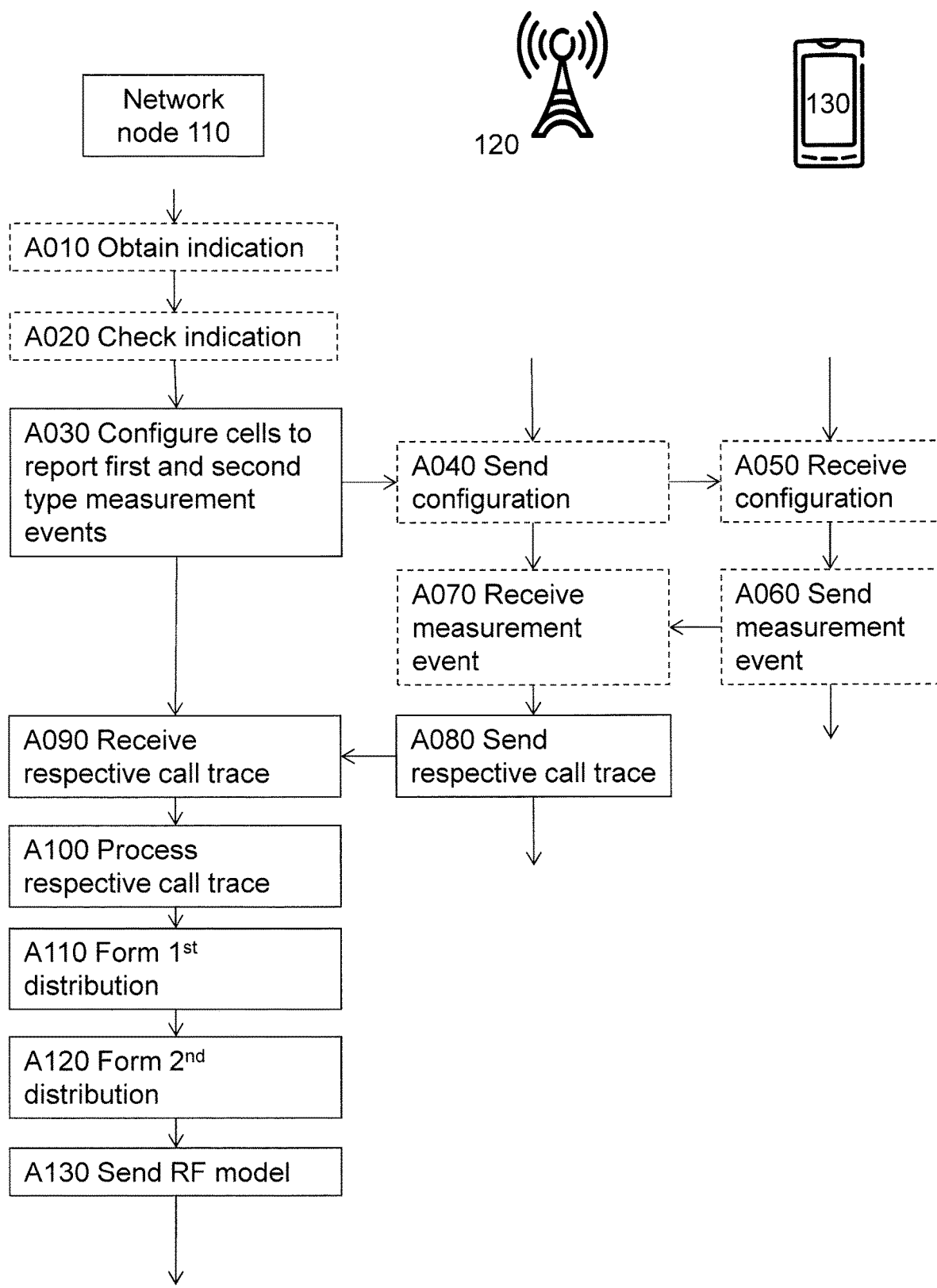
FIG. 3 is a combined signaling and flowchart illustrating the methods herein.

FIG. 3 illustrates an exemplifying method according to embodiments herein when implemented in the telecommunications system 100 of FIG. 1.

The network node 110 performs a method for providing a Radio Frequency, RF, model of a telecommunications system 100. As mentioned, the telecommunications system 100 comprises cells 120.

One or more of the following actions may be performed in any suitable order.

Action A010

In order to be able to check whether or not the certain minimum requirements are fulfilled, the network node 110 may obtain an indication about software releases or capabilities of user equipments 130 in the cells. The indication may be a featureGroupIndicators field, sent by the user equipments 130 during Radio Resource Control procedures for establishing a connection, e.g. with the cell 120.

Action A020

Now that the network node 110 has obtained the indication, the network node 110 may check that the indication indicates that at least a specific ratio of the user equipments 130 are capable of being configured with the first and second types of measurement events.

In this manner, it may be ensured that an RF model may be expected to be built during a certain time period corresponding to the specific ratio. Should the specific ratio not be fulfilled, building of the RF model may be expected to be completed in a further time period, being longer than the certain time period.

In more detail, actions A010 and A020 may be performed due to that even if vendor equipment, such as the cell 120, is able to configure these measurements, it may be that not all UEs, such as the user equipment 130, are able to report the second type of measurement event, such as event A4 or event A5. Therefore, according to some embodiments, it may be verified by use of the information in the "feature Group Indicators" field as standardized by 3GPP or, at least, UE release/version. Therefore, a connection is valid and should be considered only if the UE is capable of reporting measurement events of the first and second types.

Action A030

In order to enable processing of call traces as in action A100, the network node 110 configures, for at least a set of the cells 120, reporting of call traces.

As mentioned, the call traces are indicative of:
 the first type of measurement event relating to serving cell with a first time-to-trigger value and a first threshold value, and the second type of measurement event relating to neighbouring cells with respect to the serving cell with a second time-to-trigger value and a second threshold value, wherein the first time-to-trigger value is greater than the second time-to-trigger value.

Again, the first type of measurement event may be a measurement event A2, or event A2 for short, and the second type of measurement event may be a measurement event A3 or a measurement event A4 or a measurement event A5, aka event A3/A4/A5.

It is thus assumed that if event A2 cannot be configured for reporting UE measurements in call traces for a cell of the set, the cell can still be configured for reporting event A2 for mobility purposes, providing intra-frequency measurements, in the call traces. From these call traces, RSRP may be extracted as described in action A100 below.

Moreover, it is assumed that if event A3 or A4 or A5 cannot be configured for reporting UE measurements in call traces, at least event A3 is configured for mobility purposes providing intra-frequency measurements that are stored in call traces. Notably, its timeToTrigger parameter value is set lower than timeToTrigger parameter value of event A2. In this manner, it is ensured that the firstly reported measurement event is of either the first or second type.

Despite the fact that triggering conditions for each event depend on a conjunction of several parameters defined by 3GPP, or even vendor specific, for sake of simplicity, as discussed herein, these conditions will be referred to as a triggering value.

In the following particular example, the first type of measurement event is event A2 and the second type of measurement event is event A3 or A4 or A5.

Hence, notice that any measurement report contains serving cell RSRP value. However, only A3 or A4 or A5 events can be used for neighbor and serving cell RSRP reporting providing, by the subtraction of serving cell RSRP and neighbor RSRP, a Carrier-to-Interferer value to build an interference matrix between serving cell and neighbor cell. In fact, event A3 triggering condition that compares serving cell RSRP and neighbor cell RSRP is guaranteeing that whenever the Carrier-to-Interferer value is below a certain value that e.g. depends on the configuration parameters, such as offset, hysteresis, etc., a UE measurement report is reported. In other words, it is providing a value of the cumulative C/I distribution as it is feasible to compute the number of samples below event A3 triggering value over the total samples expected, i.e. the total number of connections. Event A4 and A5 do not provide this information but setting the proper triggering values (as specified in Table 1), they can be used to find out the complete C/I distribution.

For that reason, serving cell RSRP and C/I distribution requires different approaches as illustrated an FIG. 5, which is described in more detail further below:

Serving cell RSRP distribution can be extracted by:
A) Configuring intra-frequency event A2 UE measurement for the purpose of reporting UE measurements in call traces. Table 1 defines the desired value for the most relevant parameters of this event. Triggering value for event A2 must be set as the highest RSRP threshold that system allows. Therefore, serving cell RSRP will be available in any RF condition (not only in low coverage areas) when UE does not trigger other measurement, e.g. A3. However, "timeToTrigger" for event A2 must be set higher than the event-triggering measurements set for providing C/I information. If this condition is not fulfilled and time to trigger of event A2 is lower, as event A2 only reports serving cell RSRP (even if UE has measurements from neighboring cells), C/I distribution cannot be computed from the first measurement of the call. Notice that configuring event A2 is to make sure that serving cell RSRP values are available at any RF condition, in other words, whenever any other event has not been triggered in that connection (as all events provide serving cell RSRP).

B) Using existing intra-frequency event A2 UE measurements in the network. It may impact the accuracy of the solution as a measurement of serving cell RSRP is not received at any RF condition but it assures that eNodeB cell will receive a measurement whenever UE is in poor coverage being bad coverage areas the ones where physical RF optimization projects must focus. Therefore, whenever any other event has not been triggered, at least serving cell RSRP value is reported in bad coverage areas thanks to A2 UE measurement.

Carrier-to-Interferer (C/I) distribution can be extracted by:
A) Configuring intra-frequency event A3, A4 or A5 UE measurement for the purpose of reporting UE measurements in call traces. Table 1 defines the desired value for the most relevant parameters of the event-triggering measurement selected. Triggering value for event A3 must be set as the higher C/I value that system allows. Analogously, event A4 or A5 neighboring triggering value must be set to the minimum RSRP value that the system allows to configure and event A5 serving cell triggering value must be set to the maximum that the system allows. The purpose is that, whenever UE measures at least one neighbor, an event-triggering measurement is reported to eNodeB cell.

B) Using existing intra-frequency event A3 UE measurements in the network. Event A3 thresholds cannot be modified as UE distribution over network cells and RAN algorithm behavior will be modified, Therefore, C/I sample is received whenever C/I is lower than A3 triggering value (typically when C/I<−3 dB). It may impact the accuracy of the solution as UE measurements will be available for a subset of C/I distribution (values higher than −3 dB will not be received except for few exceptions due to other measurements active in the network). However, notice that in any case, high interference areas must be the focus of physical RF parameters optimization and most relevant interferers at A3 mobility threshold are typically the most relevant interferers in other interference conditions.

As the firstly received measurement of the call is used, there is no need of overloading the system reporting more than once each of these custom measurements. Table 1 specifies for that reason "reportAmount" to 1.

Finally, time to trigger settings assure that the first measurement of the call (assuming that UE measurements are not lost) is the measurement that can be used for RSRP and C/I distributions if and only if the measurements selected and the other measurements that network uses are the first ones to be configured in the downlink direction through "RRC Connection reconfiguration" message (see FIG. 1). If event A2 for mobility is configured in a "RRC Connection reconfiguration" message and event A3 for C/I distribution is configured in a second "RRC Connection reconfiguration" message, even if "timeToTrigger" of event A3 is lower than the "timeToTrigger" of event A2, the delay time between both "RRC Connection reconfiguration" messages increases the total time of receiving an event A3 measurement report and it might happen that A2 measurements are actually received before than A3 measurements.

In this action, certain assumptions have been made. Should these assumptions not be fulfilled, the embodiments herein may not be applicable. This means that some embodiments herein may require a set of minimum requirements to be fulfilled. The set of minimum requirements may include one or more of:

- If event A3 or A4 or A5 cannot be configured for reporting UE measurements in call traces, at least event A3 is configured for mobility purposes providing intra-frequency measurements that are stored in call traces and its timeToTrigger parameter value is lower than event A2 timeToTrigger parameter. This is typical configuration of these measurements but it is not ensured 100%.
- If event A2 cannot be configured for reporting UE measurements in call traces, at least event A2 is configured for mobility purposes providing intra-frequency measurements that are stored in call traces.
- Call traces provide at least the first measurement of every connection and UE release or UE capabilities through "featureGroupIndicators" field [3]. A connection is defined as the part of a call where the UE is connected to one serving cell previous to a handover execution or connection release. A UE may perform handovers to neighboring cell having several connections in same call and several connections in same call with same serving cell.

The measurements to be used in this approach (A3 or A4 or A5 and A2), either for reporting in call traces or for mobility purposes, should be configured in the first "RRC Connection Reconfiguration" message that the eNodeB, or the cell 120, sends to the UE configuring UE measurements, see FIG. 1, during a connection. A measurement report is said to belong to a given connection if it is reported during such connection. Table 2 summarizes the most relevant information received in the "RRC measurement report" and Table 3 provides the notation that is used herein to distinguish the event and the purpose of the measurement in the network.

TABLE 2

"RRC measurement report" information that is relevant for at least some embodiments herein.

| Cells | PCI | RSRP | RSRQ | Description |
|---|---|---|---|---|
| C | — | $P_C$ | $Q_C$ | Serving cell related RSRP and RSRQ measurements |
| $\{I_1, \ldots, I_n\}$ | $\{M_1, \ldots, M_n\}$ | $\{P_{I1}, \ldots, P_{In}\}$ | $(Q_{I1}, \ldots, Q_{In})$ | Interferer cells related RSRP, RSRQ measurements and PCI |

TABLE 3

Notation to distinguish typical event-triggering measurements configured in the network for different purposes. Event-triggering configuration parameters depend on the needs of the LTE RAN algorithm that uses them. Modifying the configuration of existing measurements linked to a RAN algorithm is not possible if it modifies UE conditions in the network (e.g. RAN mobility algorithm behavior).

| Identifier | Description |
|---|---|
| $A_3{}^{C/I}$ | Event A3 for reporting A3 event-triggering measurements in call traces. C/I index is used to highlight that intrafrequency interference (C/I) statistics are provided by this type of event and not by event A2. |
| $A_4{}^{C/I}$ | Event A4 for reporting A4 event-triggering measurements in call traces. C/I index is used to highlight that intrafrequency interference (C/I) statistics are provided by this type of event and not by event A2. |
| $A_5{}^{C/I}$ | Event A5 for reporting A5 event-triggering measurements in call traces. C/I index is used to highlight that intrafrequency interference (C/I) statistics are provided by this type of event and not by event A2. |
| $A_2{}^C$ | Event A2 for reporting A2 event-triggering measurements in call traces. C index is used to highlight that C/I values cannot be obtained by this event. However, serving cell RSRP (C) statistics are provided by it in this approach when there is no interferer that triggers intrafrequency interference (C/I) related events. |
| $A_3{}^{ANR}$ | Event A3 configured for Automatic Neighbor Relations (ANR) algorithm |
| $A_3{}^{Mobility}$ | Event A3 configured for intra-frequency mobility algorithm |
| $A_2{}^{Mobility}$ | Event A2 configured to detect poor coverage areas and trigger inter-frequency or inter-RAT mobility algorithm |
| $A_4{}^{LoadingBalancing}$ | Event A4 configured for load balancing algorithm |

Action A040

When the cell 120 is configured by the network node 110, a configuration is sent to the cell 120 from the network node 110. Typically, the configuration is sent automatically, e.g. over so called CM interface, to the cell 120.

Action A050

Once the cell 120 is configured as in action A040, the user equipment 130 may be configured accordingly, typically by means of a RCC_Connection_Reconfiguration message or the like as known from LTE terminology.

Action A060

Since the user equipment 130 has been configured to send measurement event of the first and second types, the user equipment 130 sends a measurement event of the first or second type when trigger conditions, such as the timeToTrigger values and the associated threshold values, are fulfilled.

Action A070

Subsequent to action A060, the cell 120 receives the measurement event.

Action A080

After receiving one or more measurement events, the cell 120 creates and sends a call trace indicative of the received measurement event. The cell 120 may represent one of many cells in the telecommunication system 100, where each cell sends a respective call trace.

Action A090

Subsequent to action A080, the network node 110 receives, from each cell of the set, the respective call trace representing a firstly reported measurement event of the first or second type for a connection in said each cell.

Action A100

The network node 110 processes, for said each cell of the set, the respective call trace to extract an Reference Signal Received Power "RSRP" for said each cell of the set or to extract a Carrier-To-Interferer ratio "C/I" for said each cell of the set with respect to an interfering neighbouring cell.

As an example, the network node 110 computers for the firstly measurement report of every valid connection, serving cell RSRP and C/I values for every interferer reported, such as the interfering neighboring cell.

Figure 6:
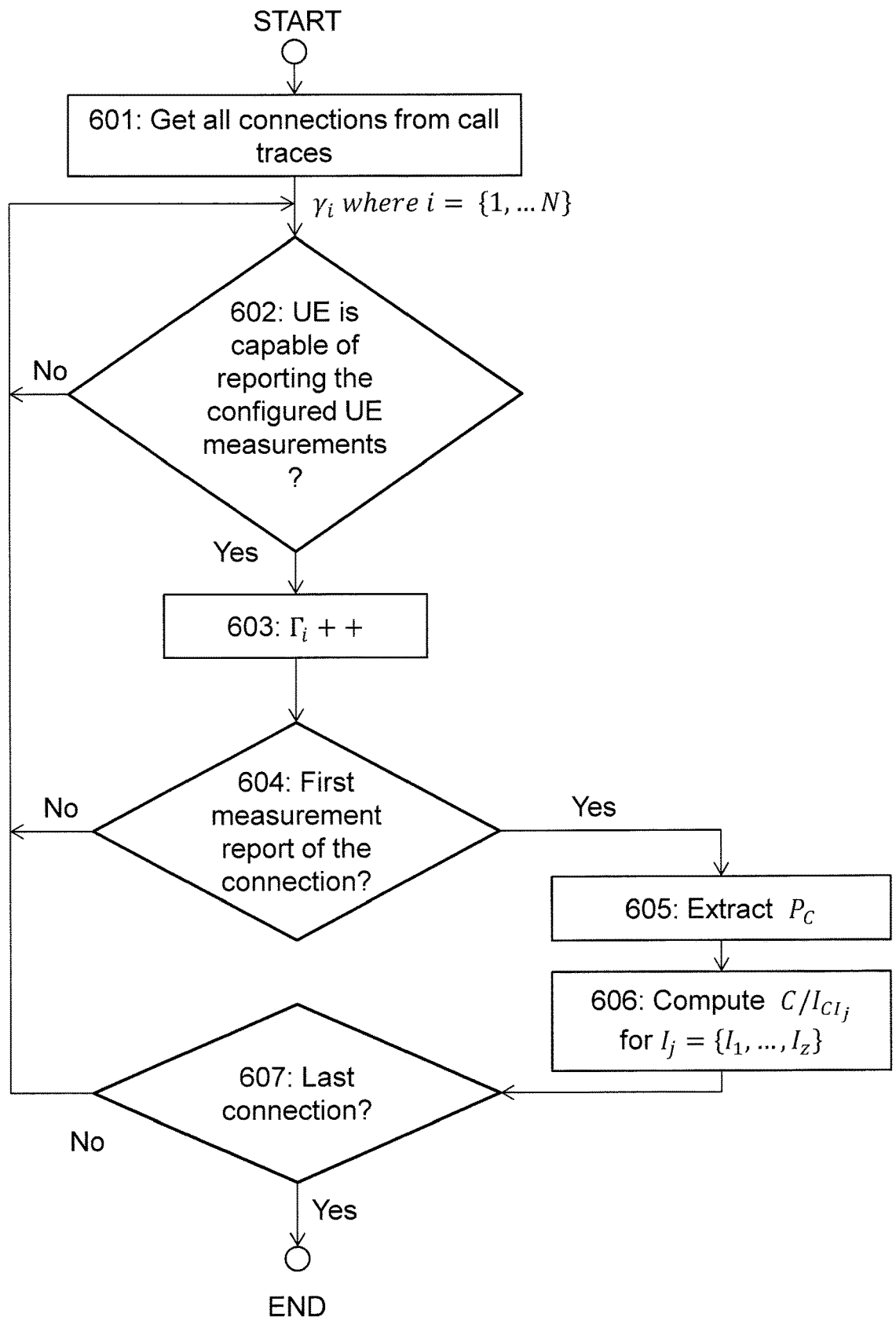
FIG. 6 is another flowchart illustrating some other actions of method in the network node.

Table 4 describes the items involved in this action and FIG. 6 indicates the process using a flow diagram. Serving cell RSRP and C/I values for every cell reported in the first UE measurement report of valid connections are available as well as the total number of valid connections per cell.

Action A110

The network node 110 forms a first distribution of RSRP based on the extracted RSRP for said each cell of the set.

Action A120

The network node 110 forms a second distribution of C/I based on the extracted C/I, e.g. for every serving cell and interferer (interfering cell), wherein the first and second distributions represent an RF model.

The network node 110 sends A130 the RF model to a network management tool 140 for managing performance of the telecommunications system 100.

In action A110 and A120 statistical distributions of serving RSRP and C/I are built using information extracted in action A100. If a valid connection does not have a measurement report, it might be due to RRC messages lost, UE anomalies or RF reasons (depending on the UE measurements selected for this approach):

Serving cell RSRP does not fulfill event A2 triggering value and neighbor cell RSRP is very low comparing to serving cell RSRP being UE unable to decode the PCI or detect it.

Serving cell RSRP does not fulfill event A2 triggering value and there is not an intra-frequency neighboring cell received by the mobile phone.

Serving cell RSRP does not fulfill event A2 triggering value and there is not at least one intra-frequency neighboring cell fulfilling event A3 triggering condition.

Figure 7:
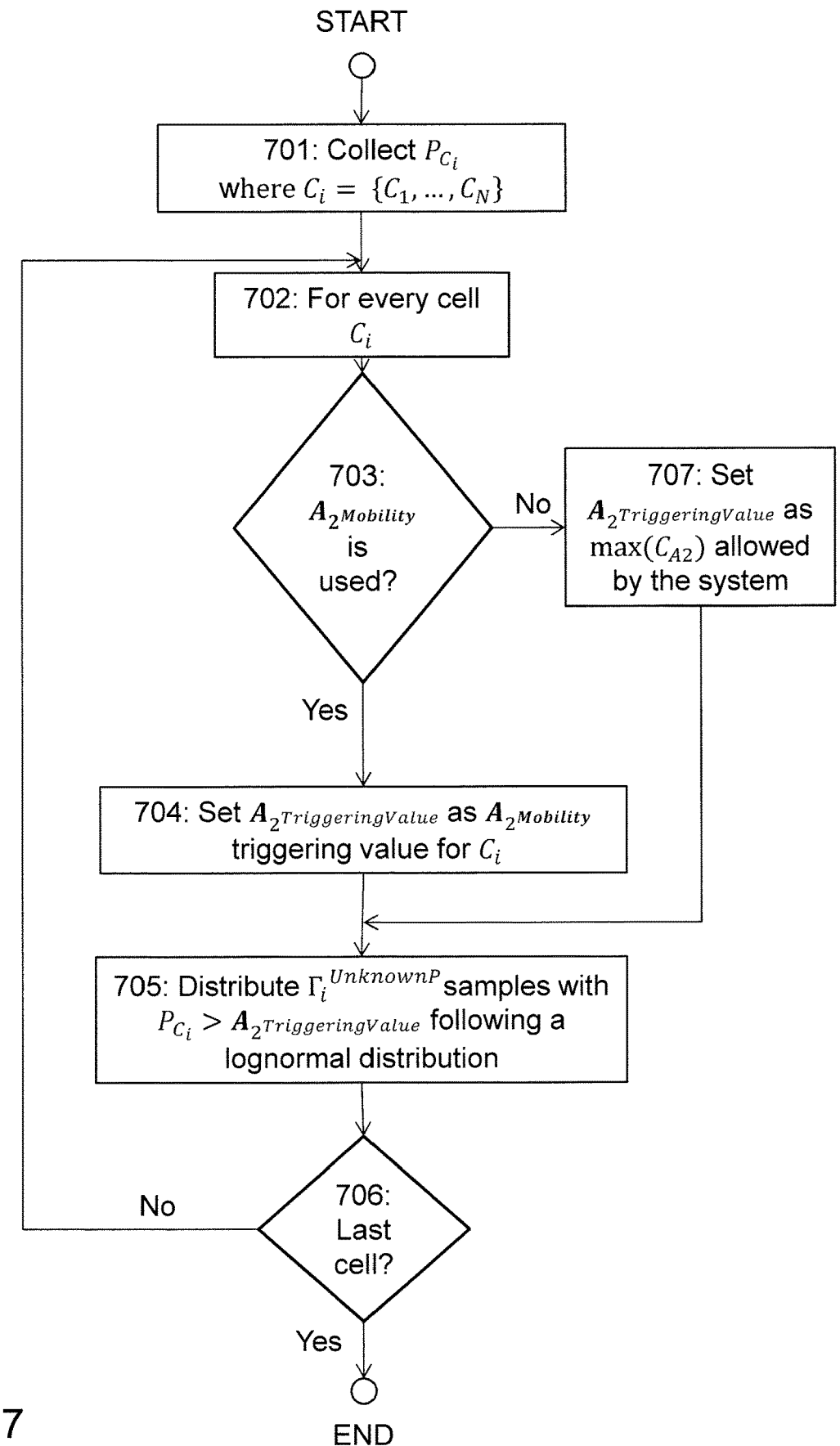
FIG. 7 is a further flowchart illustrating some further actions of method in the network node.
Figure 8:
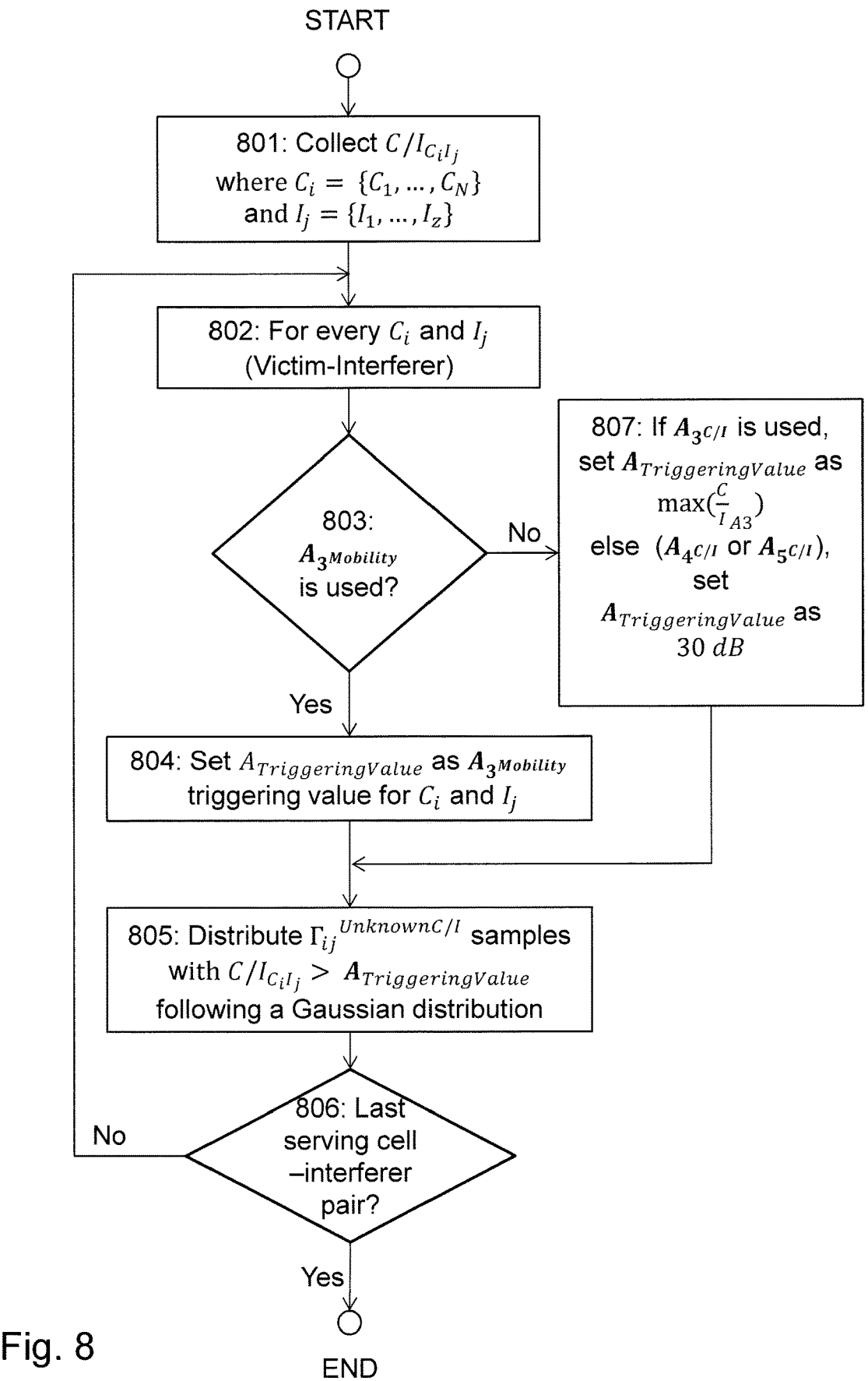
FIG. 8 is yet another flowchart illustrating some yet other actions of method in the network node.

A solution for any scenario described above is to count the number of connections without serving cell RSRP or C/I samples and fill the serving cell RSRP distribution or C/I distribution as specified in the flow diagram of FIG. 7, such as action 705, or FIG. 8, such as action 805.

Another method that can be used in these actions is assuming that both distributions are Gaussian and have a fixed standard deviation value. As measurements are providing one point of the cumulative distribution, mean of the Gaussian distribution can be computed.

An output of the algorithm is the RSRP distribution for every cell and interference matrix distribution for every pair of cells that models RF conditions being accurate for poor coverage and high interference areas as the model is coming directly from measurements and inferring the rest of the distribution to have, at least, an approximation of how RF conditions may be and could be affected if a physical parameter, such as electrical tilt, is changed. Of course, the accuracy of the RF model increases as soon as the inferred samples decrease.

Figures 4A, 4B, 4C:
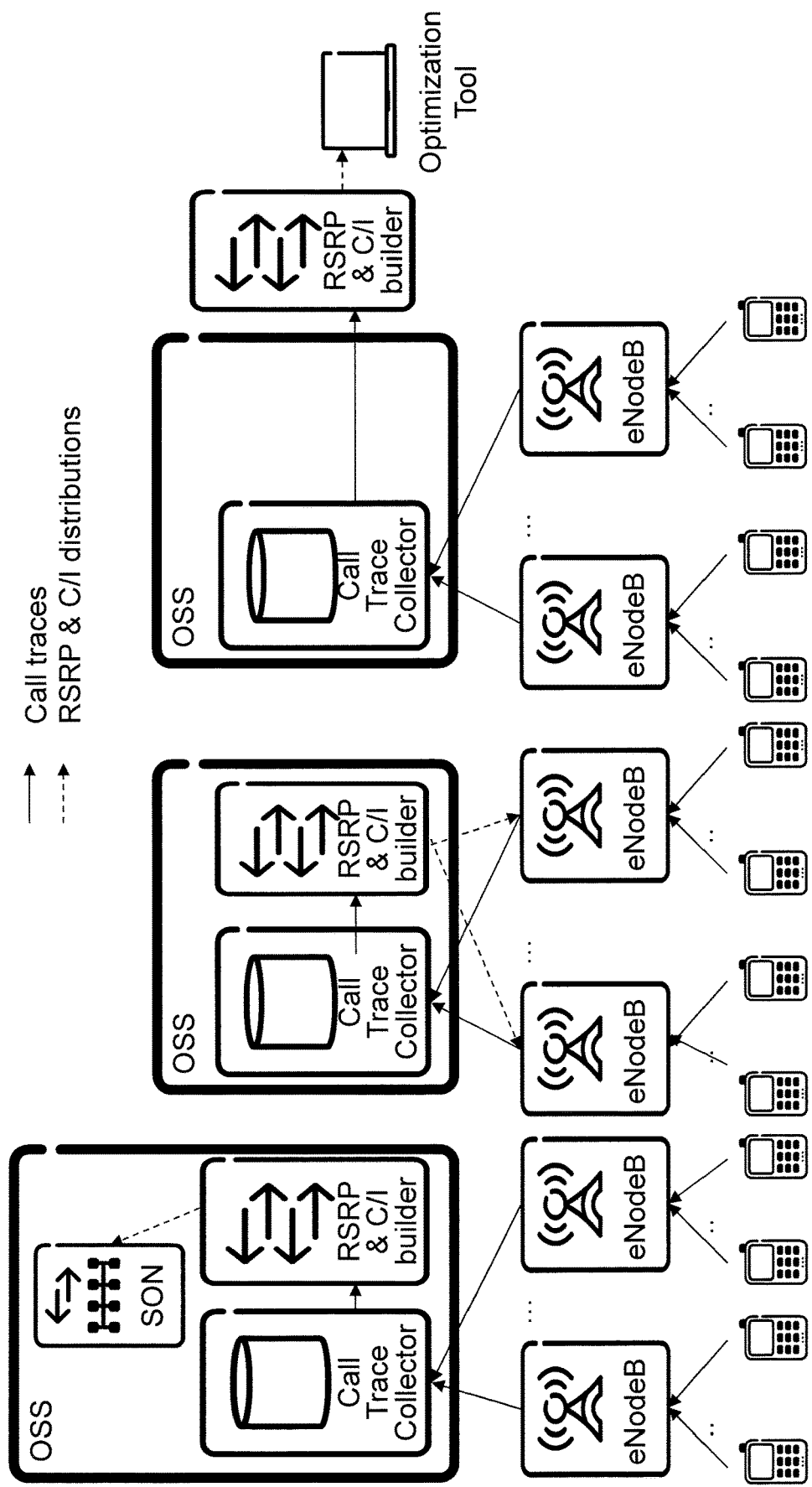
FIG. 4 is an overview illustrating various manners of implementing the embodiments herein.

As FIG. 4 shows, the embodiments herein, shown as "RSRP & C/I builder", can be implemented as part of the OSS to enhance different centralized (FIG. 4a) or distributed (FIG. 4b) SON functionalities, or it can be also used as a separate entity (FIG. 4c) for network design and optimization tasks. In more detail, the network node 110 may be implemented as part of the OSS (or eNodeB) to enhance different centralized, or distributed, SON functionalities, or as a separate entity to be used for network optimization tasks. It also is a versatile solution that can be easily adapted to different scenarios depending on vendor capabilities.

TABLE 1

Desired configuration of event-triggering measurements when they can be configured for reporting UE measurements in call traces. User must select one of the options between $A_3C/I$, , $A_4C/I$ and $A_5C/I$ depending on which option is available in the vendor equipment. Notice as well that timeToTrigger of selected option must be lower than the timeToTrigger of any of measurements configured in the cell.

| Event | Trigger Quantity | Report Quantity | Max Report Cells | Report amount | Carrier frequency | Time to trigger | Triggering value |
|---|---|---|---|---|---|---|---|
| $A_3C/I$ | RSRP | Both (RSRP and RSRQ) | 8 | 1 | Same as serving cell | $TTT_{A3} < TTT_{Ai}$ | $\max\left(\dfrac{C}{I_{A3}}\right)$ |
| $A_4C/I$ | | | | | | $TTT_{A4} < TTT_{Ai}$ | min ($I_{A4}$) |
| $A_5C/I$ | | | | | | $TTT_{A5} < TTT_{Ai}$ | max ($C_{A5}$) min ($I_{A5}$) |
| $A_2C$ | | | — | | | $TTT_{AiC/I} < TTT_{A2}$ being i = {3, 4, 5} | max($C_{A2}$) |

TABLE 4

Notation used for call traces information.

| Item | Description |
| --- | --- |
| N | Number of cells in call traces |
| C | Serving cell (or victim cell) |
| $\{I_1, \ldots, I_2\}$ | Interferer cells in measurement report |
| $P_{Xi}$ | RSRP value of cell i with X = {C, I} where C means serving cell and I means interferer |
| $C/I_{ij}$ | C/I relation between serving cell i and interferer j |
| $\gamma_i$ | Connection of serving cell i |
| $\Gamma_i$ | Number of valid connections for serving cell i |
| $\Gamma_{ij}^{UnknownC/I}$ | Number of Valid connections for serving cell i where $C/I_{ij}$ sample is unknown |
| $\Gamma_i^{UnknownP}$ | Number of valid connections for serving cell i where $P_{Ci}$ sample is unknown |

Figure 5:
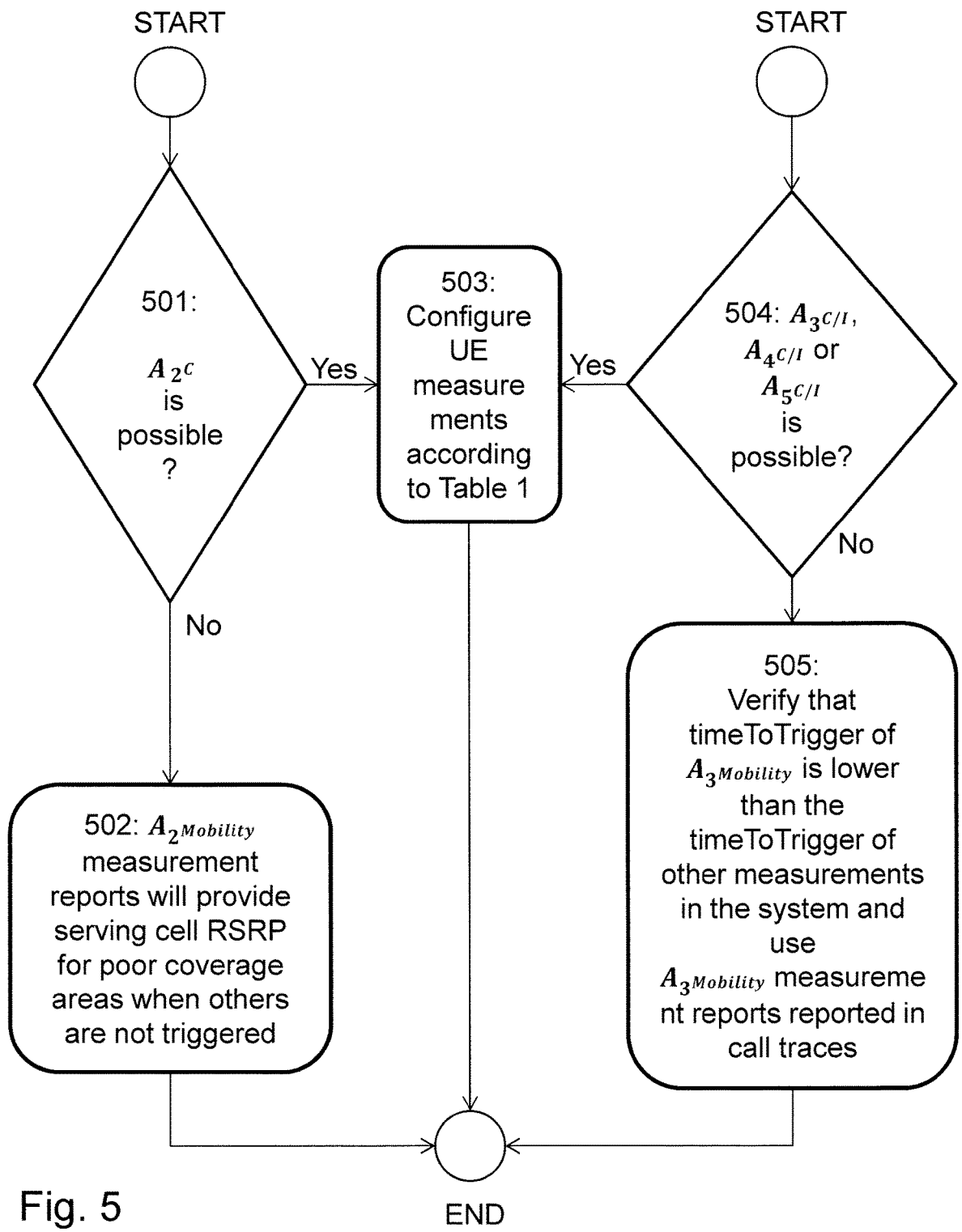
FIG. 5 is a flowchart illustrating some actions of method in the network node.

As part of action A030, FIG. 5 illustrates approaches for extraction of RSRP and/or C/I distributions. The network node 110 may be the RSRP & C/I builder in FIGS. 4a-4c.

Action 501

The network node 110 checks if event $A_{2c}$ is possible.

Action 502

Then, in action 502 when event $A_{2c}$ is not possible, the network node 110 receives call traces indicative of RSRP in serving cell for poor coverage areas when others are not triggered.

Action 503

Otherwise, in action 503, when event $A_{2c}$ is possible, the network node 110 configures UE measurements according to table 1.

Action 504

Action 503 is also performed when $A_3^{C/I}$, $A_4^{C/I}$ or $A_5^{C/I}$ is found possible in action 504.

Action 505

Otherwise, in action 505 when $A_3^{C/I}$, $A_4^{C/I}$ or $A_5^{C/I}$ is not possible, it is verified that timeToTrigger of $A_3^{Mobility}$ is lower than the timeToTrigger of other measurements in the system 100 and use of $A_3^{Mobility}$ measurement reports reported in call traces.

As part of action A100, FIG. 6 illustrates how processing of call traces may be performed. Again, the network node 110 may be the RSRP & C/I builder in FIGS. 4a-4c. In this example, one or more of the following actions may be performed.

Action 601

The network node 110 gets all connections from the received call traces.

Action 502

The network node 110 checks if the user equipment 130 is capable of reporting the configured UE measurements.

Action 603

If so, the network node 110 increases the number of valid connections for serving cell.

Action 604

The network node 110 checks if call traces indicates the firstly received measurement event for the connection.

Action 605

If so, the network node 110 extracts $P_c$.

Action 606

The network node 110 also computes the C/I values for all interferers, i.e. all interfering neighboring cells.

Action 607

The network node 110 check if this is the last connection, if not proceed to action 602.

Now as part of action A110, FIG. 7 illustrates sub-actions of forming the first distribution of RSRP. Again, the network node 110 may be the RSRP & C/I builder in FIGS. 4a-4c. In this example, one or more of the following actions may be performed.

Action 701

The network node 110 collects $P_{c_i}$.

Action 702

The network node 110 for every cell of the set of cell.

Action 703

The network node 110 checks if $A_2^{Mobility}$ is used.

Action 704

If so, the network node 110 sets $A_2^{TriggeringValue}$ as $A_2^{Mobility}$ triggering value for $C_i$.

Action 705

Then, the network node 110 distributes $\Gamma_i^{UnknownP}$ samples with $P_{C_i} > A_2^{TriggeringValue}$ following a lognormal distribution.

Action 706

The network node 110 checks if currently processed cell Ci is the last cell. If not proceed to action 702.

Action 707

If $A_2^{Mobility}$ is not used, the network node 110 sets $A_2^{TriggeringValue}$ as $\max(C_{A2})$ allowed by the system 100. Then, proceed to action 705.

Moreover, as part of action A120, FIG. 8 illustrates sub-actions of forming the second distribution of C/I. Again, the network node 110 may be the RSRP & C/I builder in Figures 4a-4c. In this example, one or more of the following actions may be performed.

Action 801

The network node 110 collects $C/I_{C_ij}$, where $C_i = \{C_1, \ldots, C_N\}$ and $I_j = \{I_1, \ldots, I_z\}$.

Action 802

The network node 110 repeats for every $C_i$ and $I_j$ (Victim-Interferer).

Action 803

The network node 110 checks if $A_3^{Mobility}$ is used.

Action 804

If so, the network node 110 sets $A_{TriggeringValue}$ as $A_3^{Mobility}$ triggering value for $C_i$ and $I_j$.

Action 805

The network node 110 distributes $\Gamma_{ij}^{UnknownC/I}$ samples with $C/I_{C_iI_j} > A_{TriggeringValue}$ following a Gaussian distribution.

Action 806

The network node 110 checks if the currently processed cells is the last serving cell-interferer pair. If not, the network node 110 proceeds to action 802.

Action 807

If $A_3^{Mobility}$ is not used in action 803, the network node 110 check if $A_{3_{C/I}}$ is used, and then sets $A_{TriggeringValue}$ as $$\max(\frac{C}{I_{A3}})$$

else ($A_{4_{C/I}}$ or $A_{5_{C/I}}$), sets $A_{TriggeringValue}$ as 30 dB.

An advantage is hence that requirements of what information to be included in the call traces are low. Depending of vendor of network equipment, such as the cell 120, call traces may include just a few measurement reports without identifying the event or frequency measured. The embodiments herein process the firstly received measurement report for every connection and include the configuration of UE measurement reports, as in stage 201, in such a way that there is no need of identifying which type of measurement is reported in the call traces.

A benefit of the embodiments herein is that UE periodical measurements are not required to be reported in the call traces provided to the OSS. Instead, the RF model is built up from intra-frequency event-triggered UE measurements.

The embodiments herein may be adapted to work with event A2 and event A3 that are typically used for mobility purposes in LTE network without configuring extra measurements at the cost of decreasing the accuracy of the RF model.

The embodiments presented herein may provide a direct measurement of cell RSRP distribution and interference conditions from an operational network allows taking any metric, e.g. radio environment, traffic properties, system features, etc., into account without any need of deep knowledge of the scenario and network configuration.

According to an example implementation of the embodiments herein, event A4 was configured for reporting in the call traces. When the event A4 or other event configured in the network was not triggered, the event A2 was used to complete serving RSRP distribution.

In this example implementation, there were two different call traces options:
  A 3GPP standardized call trace solution but it is limited to 50 eNodeBs, far away from our purposes that included electrical tilt optimization for more than 400 eNodeBs.
  A Network call traces solution that could collect data for all the network where the information provided is the following:
    UE release
    First and last measurement report per call.
    For every measurement, its origin (A2, A3, A4) was not provided.

For all cells, event A2 was configured in the network for mobility purposes. Additionally, event A3 was configured in the network for intra-frequency mobility and timeToTrigger of event A3 was smaller than the timeToTrigger of event A2. Other measurements configured in the network for some specific cells or inter-frequency and inter-technology purposes are not statistically relevant.

The example implementation also allowed the possibility of configuring event A4 RRC measurement reports for reporting these measurements in call traces (therefore, not affecting the behavior of other RAN algorithms).

In this example implementation, event A4 intra-frequency measurement was configured to be reported in call traces for 3 eNodeBs. The guidelines from Table 1 were not followed.

Example features: Configuration parameters set for event A4 are:
  Intra-frequency measurement set in measObjectEUTRA object (carrierFreq parameter).
  ReportConfig object has the following parameters value:
    triggerTypeEUTRA set to event A4
    maxReportCells set to 8
    RSRP Eutra threshold set to −110 dBm
    reportInterval set to 5120 ms
    reportAmount set to 2 or infinity depending on the site
    reportQuantity set to both (RSRP and RSRQ are reported)
    triggerQuantity set to RSRP
    timeToTrigger set to 256 ms or 320 ms depending on the site
First DL RRC Connection reconfiguration message sent from the network to the UE in order to configure RRC measurement reports was configuring mobility related event A2 and event A3 plus user configurable event A4 for reporting in call traces. As a UE measurement report is triggered if event triggering conditions are fulfilled during timeToTrigger value, setting lower timeToTrigger value to event A4 means that even if triggering conditions of other events are fulfilled, first measurement report will be triggered by event A4.
FIG. 7 shows C/I distribution for a particular pair of cells. It can be observed that there is no visibility of C/I distribution above C/I=−4 dB without event A4 activation. Furthermore, in the case of these 3 eNodeBs, the number of interferers measured by eNodeB cells increase from a total of 81 interferer relations without event A4 to 108 interferer relations with event A4. FIG. 8 shows C/I distribution for three of the new interferer relations that were not detected using event A3 measurements. Then, it is preferable to use event A4 as it increases, as expected, the visibility of the interference conditions in the network.

Figure 9:
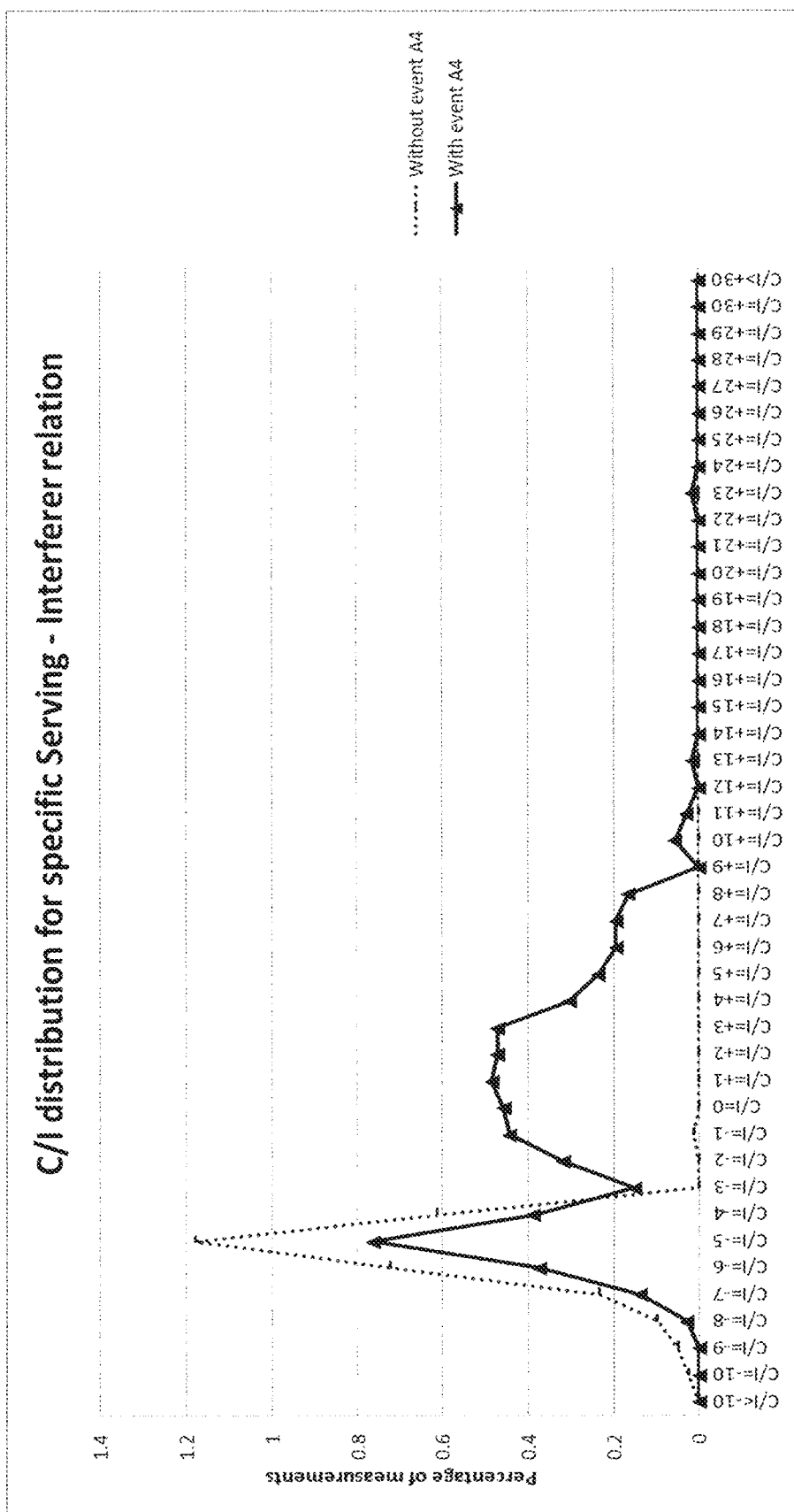
FIG. 9 is a diagram illustrating C/I distribution.

FIG. 9 shows RSRP distribution for a particular cell. Notice there is full visibility of RSRP values for connections below event A2 triggering value (−90 dBm). The number of measurements received over event A2 triggering value is drastically reduced. Event A4 activation affected RSRP distribution as connections that triggered A2 and A4 for instance, were counting that measurement twice. When the first measurement of the call is obtained, the impact of activating event A4 for the part of the RSRP distribution below event A2 triggering value is limited. However, above event A2 triggering value, more measurements could be received (depending on the scenario) due to event A4 activation.

Another objective in RF model is that both distributions are built through a fair RF environment sampling. Then, the first measurement of the call is extracted due to two reasons:

Call traces solution provided the first and the last measurement report without identifying the type of measurement reported (A3, A4, A2). Thanks to timeToTrigger parameter, the behavior of the first triggered measurement of the call could be controlled.

During a connection, event A4 and also event A2 could be triggered. As the number of total measurements considered for every cell affects to the final probability values and event A2 measurement will not provide samples for C/I distribution, event A4 measurement is preferred in this case. Analogously, if event A4 and event A3 are triggered during a connection, as event A3 will report only neighbors fulfilling event A3 triggering value, some neighbor relations could be missed and RF model could be affected.

If during a connection there is no measurement report triggered (neither event A4 or event A2), the connection is assumed to have good RF conditions, assuming a fixed serving cell RSRP value higher than event A2 RSRP threshold. This is a simplification of stage 203 described herein.

Finally, connections where UE release is 8 were discarded as event A4 reporting capabilities is not guaranteed.

Next, the configuration of event A4 was extended to a higher cluster.

Example features:
Configuration parameters set for event A4 are same as trial configuration except for:
RSRP Eutra threshold set to −120 dBm
reportAmount set to 1
timeToTrigger set to 40 ms
During this test, the number of drops increased and handover attempts decreased at cluster level. Comparing day to day statistics before and after the activation for 78 eNodeBs, number of drops increased by 20% while handover attempts decreased 11%. Both trends pointed out that, for some reason, the number of drops could have increased due to the fact that handovers (triggered by event A3 measurements) were not produced. The decision was to set event A4 timeToTrigger higher than event A3 timeToTrigger for mobility purposes but lower to event A2 timeToTrigger value to still provide fair vision of interference conditions.

Finally, after event A4 timeToTrigger change, there was no noticeable degradation at cluster level and measurement collection phase (stage 201) was finished.

Electrical tilt optimization was performed in a 50 eNodeB cluster achieving good results.

In this execution of the approach in the field, RSRP EUTRA threshold for event A4 could not be set to −140 dBm (minimum allowed by the system) as specified in Table 1. However, further optimizations were done using this approach in different clusters of the market and measurement collection of stage 201 was done with the recommended RSRP threshold value.

The solution was used successfully in other areas significantly improving network performance.

FIG. 9 illustrates C/I distribution comparison for a specific serving cell and interferer with and without event A4 activated. Both distributions use all RRC measurement reports collected in call traces. Call traces data without event A4 was collected from 11 h to 13 h. Call traces data with event A4 was collected from 16 h to 17 h the following day. Even if time and therefore traffic distribution is different, it can be observed that there is no visibility of C/I distribution above C/I=−4 dB without event A4 activation.

Figure 10:
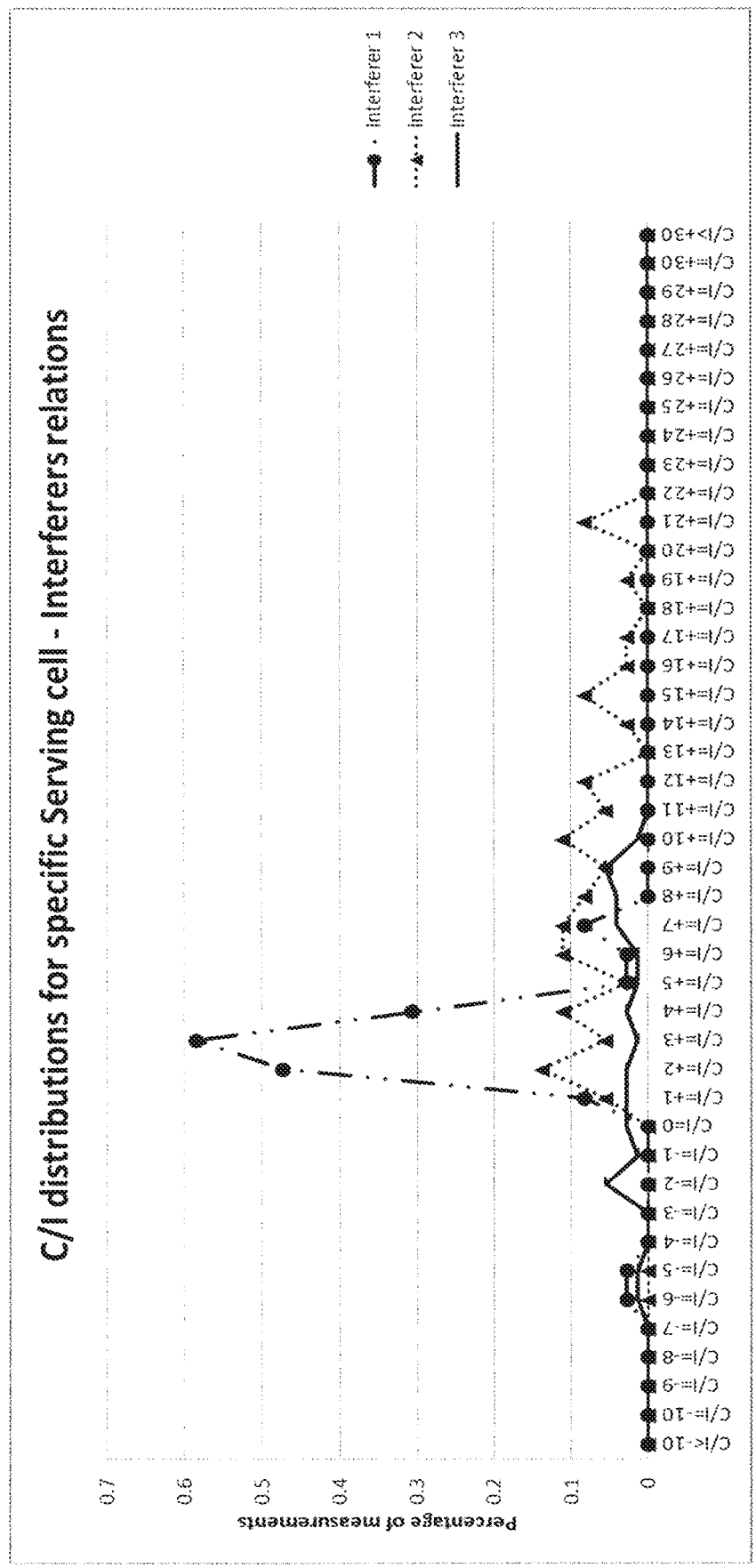
FIG. 10 is another diagram illustrating C/I distribution.

FIG. 10 shows C/I distributions computed using all RRC measurement reports in call traces for three serving cell-interferer relations. Instead of showing number of measurements for each range, the percentage of samples over the total number of measurements received for serving cell is presented. The majority of the C/I samples are above C/I=3 being undetectable interferers by event A3 measurements but might be relevant interferers to consider in physical parameters optimization.

Figure 11:
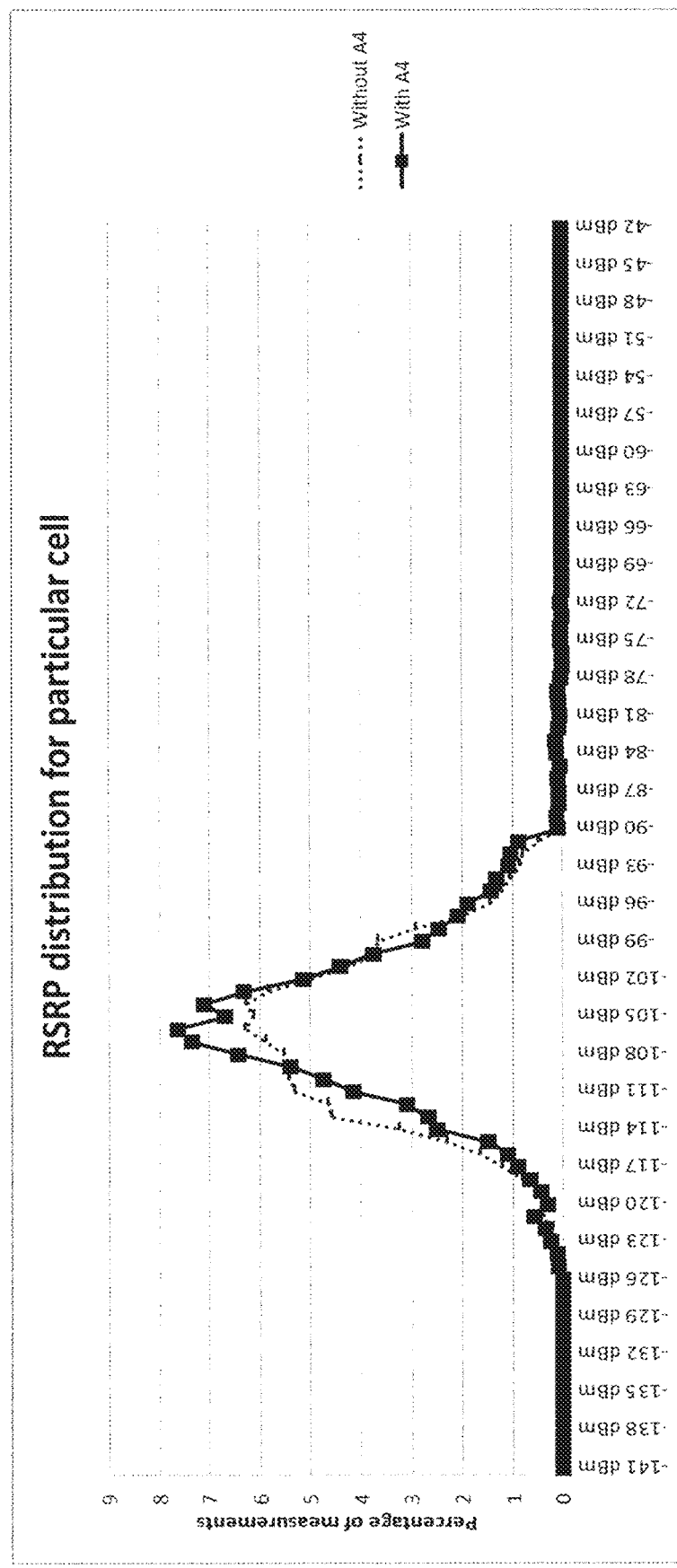
FIG. 11 is a further diagram illustrating RSRP distribution.

FIG. 11 illustrates RSRP distribution for a particular cell with and without event A4 activation. Instead of showing number of measurements for each range, the percentage of samples over the total number of measurements received for serving cell is presented. It can be observed that there is no visibility of RSRP values over −90 dBm that is the triggering value of event A2.

Figure 12A:
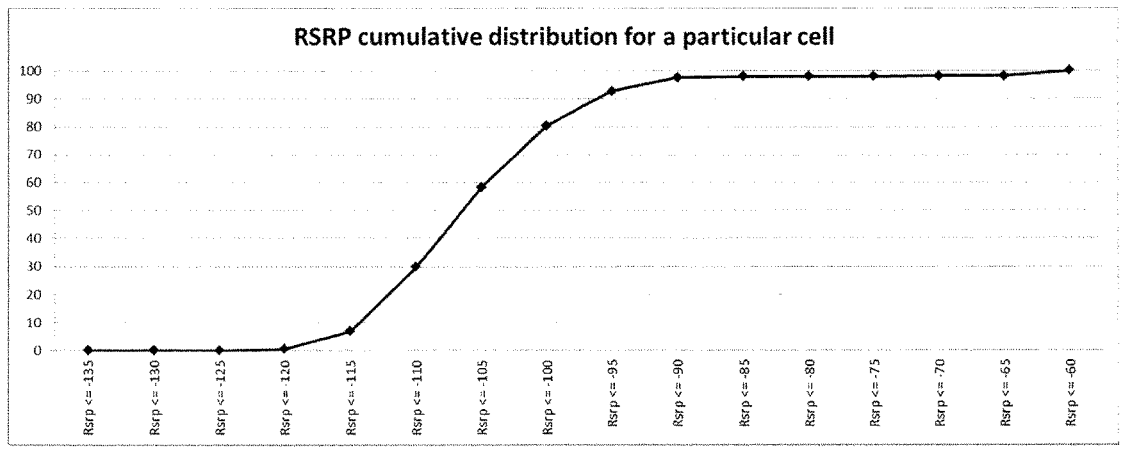
FIGS. 12a and 12b are yet further diagrams illustrating cumulative RSRP and C/I distribution.
Figure 12B:
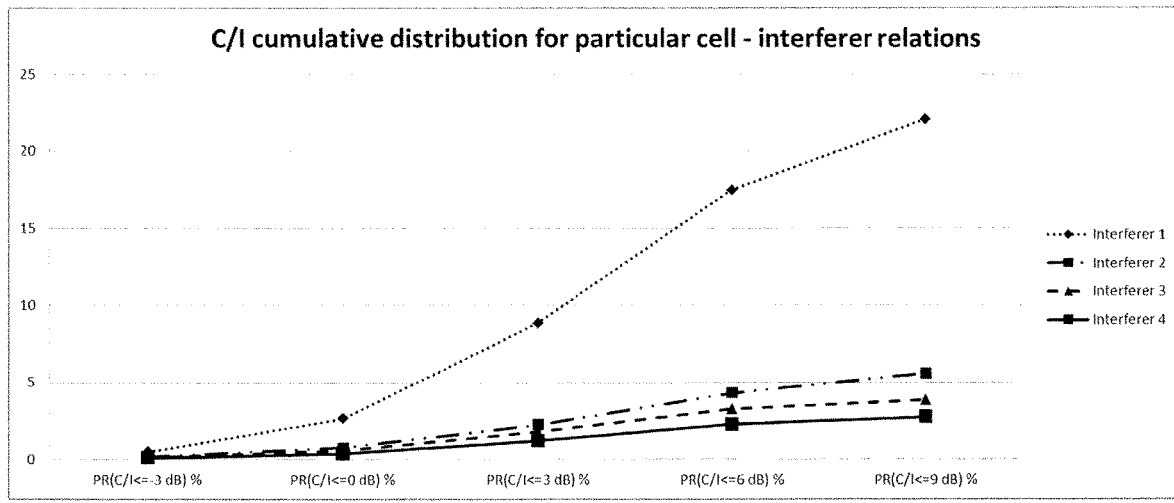

FIGS. 12a and 12b shows the cumulative RSRP and C/I distribution for a serving cell and some interferer relations. This data is the result after stage 203 is done and is the input for ECO tool.

Figure 13:
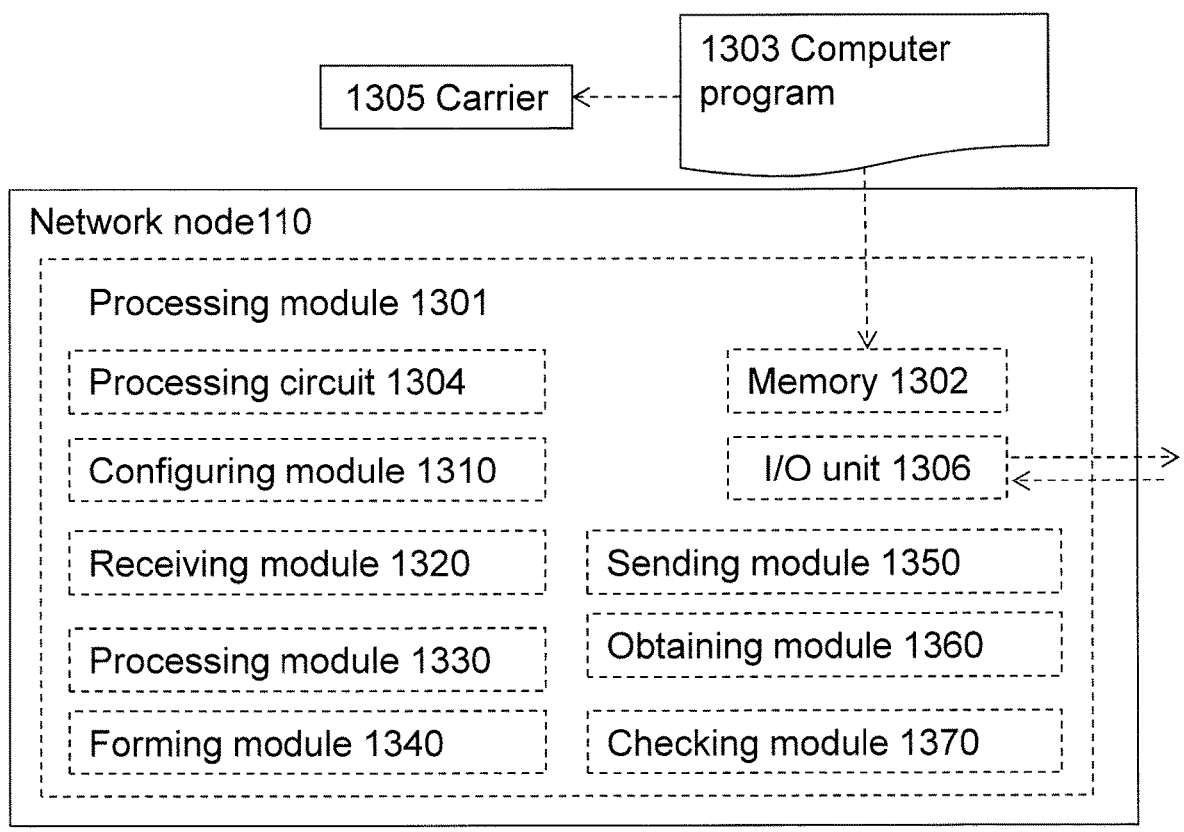
FIG. 13 is a block diagram illustrating embodiments of the network node.

With reference to FIG. 13, a schematic block diagram of embodiments of the network node 110 of FIG. 1 is shown.

The network node 110 may comprise a processing module 1301, such as a means for performing the methods described herein. The means may be embodied in the form of one or more hardware modules and/or one or more software modules.

The network node 110 may further comprise a memory 1302. The memory may comprise, such as contain or store, instructions, e.g. in the form of a computer program 1303, which may comprise computer readable code units.

According to some embodiments herein, the network node 110 and/or the processing module 1301 comprises a processing circuit 1304 as an exemplifying hardware module. Accordingly, the processing module 1301 may be embodied in the form of, or 'realized by', the processing circuit 1304. The instructions may be executable by the processing circuit 1304, whereby the network node 110 is operative to perform the methods of FIG. 2 and/or FIG. 3-8. As another example, the instructions, when executed by the network node 110 and/or the processing circuit 1304, may cause the network node 110 to perform the method according to FIG. 2 and/or 3-8.

FIG. 13 further illustrates a carrier 1305, or program carrier, which comprises the computer program 1303 as described directly above.

In some embodiments, the processing module 1301 comprises an Input/Output module 1306, which may be exemplified by a receiving module and/or a sending module as described below when applicable.

In further embodiments, the network node 110 and/or the processing module 1301 may comprise one or more of a configuring module 1310, a receiving module 1320, a processing module 1330, a forming module 1340, a sending module 1350, an obtaining module 1360, and a checking module 1370 as exemplifying hardware modules. In other examples, one or more of the aforementioned exemplifying hardware modules may be implemented as one or more software modules.

Accordingly, the network node 110 is configured for providing a RF model of a telecommunications system 100. As mentioned, the telecommunications system 100 comprises cells 120.

Therefore, according to the various embodiments described above, the network node 110 and/or the processing module 1301 and/or the configuring module 1310 is configured for configuring, for at least a set of the cells 120, reporting of call traces indicative of a first type of measurement event relating to serving cell with a first time-to-trigger value and a first threshold value, and a second type of measurement event relating to neighbouring cells with respect to the serving cell with a second time-to-trigger value and a second threshold value, wherein the first time-to-trigger value is greater than the second time-to-trigger value.

Moreover, the network node 110 and/or the processing module 1301 and/or the receiving module 1320 is configured for receiving, from each cell of the set, a respective call trace representing a firstly reported measurement event of the first or second type for a connection in said each cell.

The network node 110 and/or the processing module 1301 and/or the processing module 1330 is further configured for processing, for said each cell of the set, the respective call trace to extract an Reference Signal Received Power "RSRP" for said each cell of the set or to extract a Carrier-To-Interferer ratio "C/I" for said each cell of the set with respect to an interfering neighbouring cell.

Furthermore, the network node 110 and/or the processing module 1301 and/or the forming module 1340 is configured for forming a first distribution of RSRP based on the extracted RSRP for said each cell of the set. The network node 110 and/or the processing module 1301 and/or the forming module 1340, or another forming module (not shown) is configured for for forming a second distribution of C/I based on the extracted C/I. The first and second distributions represent an RF model. The network node 110 and/or the processing module 1301 and/or the sending module 1350 is configured for sending the RF model to a network management tool 140 for managing performance of the telecommunications system 100.

As mentioned, the first type of measurement event may be a measurement event A2. The second type of measurement event may be a measurement event A3 or a measurement event A4 or a measurement event A5.

In some embodiments, the network node 110 and/or the processing module 1301 and/or the obtaining module 1360 may be configured for obtaining an indication about software releases or capabilities of user equipments 130 in the cells. The indication may be a featureGroupIndicators field, sent by the user equipments 130 during Radio Resource Control procedures for establishing the connection. In these embodiments, the network node 110 and/or the processing module 1301 and/or the checking module 1370 may be configured for checking that the indication indicates that at least a specific ratio of the user equipments 130 are capable of being configured with the first and second types of measurement events.

In order facilitate implementation of the embodiments herein, some further description of known technologies are provided here.

LTE RRC protocol specifications [3] (3GPP TS 36.331) define event-triggering UE measurement reports as well as UE measurement reports that are sent periodically by UE, also called periodical measurements. Periodical measurements are used for reporting strongest cells.

On one hand, RRC event-triggering measurement reports provide RSRP and/or Reference Signal Received Quality (RSRQ) measurements only when triggering conditions are met. Examples of event-triggering LTE measurement reports and their definition are:

Event A1 (Serving becomes better than threshold).
Event A2 (Serving becomes worse than threshold).
Event A3 (Neighbor becomes offset better than serving cell).
Event A4 (Neighbor becomes better than threshold).
Event A5 (Serving cell becomes worse than threshold 1 and neighbor becomes better than threshold 2).

3GPP defines the elements that need to be specified for these measurements, The most relevant for this solution are:

EUTRA measurement object "carrierFreq" that defines the frequency that the UE will measure,
EUTRA Report Configuration "event ID" that indicates the event type (A1, A2, A3 . . . ).
EUTRA Report Configuration "triggerQuantity" that indicates whether RSRP or RSRQ will be used to trigger the UE measurement.
EUTRA Report Configuration "reportQuantity" that indicates whether RSRP and RSRQ should be reported in UE measurement or only the "triggerQuantity".
EUTRA Report Configuration "maxReportCells" that defines the maximum number of neighboring cells that will be reported in the UE measurement (maximum is 8).
EUTRA Report Configuration thresholds, offsets and hysteresis depending on the event type (A1, A2, A3, . . . ) that defines the "entering" and "leaving" condition of each event. As an example, if "triggerQuantity" is RSRP, A2 threshold is set to −110 dBm and A2 hysteresis is defined to 1 dB:
  "Entering condition" is fulfilled if serving cell RSRP is less than −111 dBm (A2 threshold minus A2 hysteresis).
  "Leaving condition" is fulfilled if serving cell RSRP is higher than −109 dBm (A2 threshold plus A2 hysteresis).
    EUTRA Report Configuration "timeToTrigger" that defines the time that the UE should be fulfilling the entering condition to report a UE measurement report.
    EUTRA Report Configuration "reportInterval" that indicates how often a new UE measurement report must be sent once the first UE measurement report is sent and leaving condition is not fulfilled.
    EUTRA Report Configuration "reportAmount" that provides how many UE measurement reports will be sent by the UE once the first UE measurement report is sent and leaving condition is not fulfilled.

UE event-triggering measurements report serving cell RSRP and/or RSRQ and up to 8 LTE neighbor cells if and only if cells fulfill the entering condition of the event. Therefore, a UE could be interfered by a neighbor cell that is not being reported in the event-triggering measurement report to eNodeB cell because it does not fulfill event entering condition.

Even more, notice that when triggering condition is related exclusively to serving cell RSRP or RSRQ, neighboring cells RSRP and/or RSRQ are not reported by the UE.

Therefore, event A2 helps detecting poor coverage areas but it cannot be used for reporting interferers RSRP and/or RSRQ in poor coverage areas even if they are strong interferers (neighboring cells with RSRP or RSRQ comparable to serving cell RSRP or RSRQ). Analogously, events whose triggering condition is related to neighboring cell RSRP or RSRQ (as for events A3, A4 and AS) will not produce UE measurements if there is no, at least, one neighbor fulfilling triggering conditions defined in the event, reporting exclusively the neighboring cells that fulfill triggering conditions. As a result, eNodeB cell will not receive A3 measurements for detecting areas where serving cell RSRP is low unless there is at least one interferer that complies with A3 triggering conditions.

Event-triggering measurements are typically used for detecting low coverage or high interference areas to trigger mobility, load balancing or ANR optimization algorithms. Depending on LTE vendor equipment capabilities, an external agent could be able to configure one of these events purely for reporting UE measurements in call traces allowing custom settings (e.g. thresholds, hysteresis or "timeToTrigger") for these measurements without affecting network behavior (e.g. mobility algorithm).

On the other hand, RRC periodical measurement reports provide RSRP and/or RSRQ for the serving cell and the strongest neighboring cells. They do not have "entering" or "leaving" conditions. Therefore, there is no need of defining thresholds, hysteresis or "timeToTrigger" values. The parameters "reportInterval" and "reportAmount" define how often and how many measurement reports the eNodeB cell will receive respectively. Parameter setting "maxReportCells" defines up to how many neighboring cells will be reported. Instead of "eventID" parameter, the system should set "periodical" value and the "purpose" of the measurement that needs to be configured as "reportStrongestCells" [3].

Therefore, periodical measurements perform a sampling of the RF environment no matter what the coverage and interference conditions are. Up to 8 RSRP and/or RSRQ measurements from the strongest neighboring cells and RSRP and/or RSRQ of the serving cell are reported. Good and poor coverage and interference areas are characterized using these measurements.

Intra-frequency periodical measurements are used by ECO tool and provided in Ericsson markets through the LTE feature "PM-Initiated UE Measurements" [5] to compute the serving cell RSRP distribution and interference matrix. That allows the creation of the RF model which is based on OSS data for a specific set of physical RF related parameters such as antenna pattern, electrical tilt, mechanical tilt, azimuths, etc.

As used herein, the term "node", or "network node", may refer to one or more physical entities, such as devices, apparatuses, computers, servers or the like. This may mean that embodiments herein may be implemented in one physical entity. Alternatively, the embodiments herein may be implemented in a plurality of physical entities, such as an arrangement comprising said one or more physical entities, i.e. the embodiments may be implemented in a distributed manner, such as on a set of server machines of a cloud system.

As used herein, the term "module" may refer to one or more functional modules, each of which may be implemented as one or more hardware modules and/or one or more software modules and/or a combined software/hardware module in a node. In some examples, the module may represent a functional unit realized as software and/or hardware of the node.

As used herein, the term "program carrier", or "carrier", may refer to one of an electronic signal, an optical signal, a radio signal, and a computer readable medium. In some examples, the program carrier may exclude transitory, propagating signals, such as the electronic, optical and/or radio signal. Thus, in these examples, the carrier may be a non-transitory carrier, such as a non-transitory computer readable medium.

As used herein, the term "processing module" may include one or more hardware modules, one or more software modules or a combination thereof. Any such module, be it a hardware, software or a combined hardware-software module, may be a determining means, estimating means, capturing means, associating means, comparing means, identification means, selecting means, receiving means, sending means or the like as disclosed herein. As an example, the expression "means" may be a module corresponding to the modules listed above in conjunction with the Figures.

As used herein, the term "software module" may refer to a software application, a Dynamic Link Library (DLL), a software component, a software object, an object according to Component Object Model (COM), a software component, a software function, a software engine, an executable binary software file or the like.

As used herein, the term "processing circuit" may refer to a processing unit, a processor, an Application Specific integrated Circuit (ASIC), a Field-Programmable Gate Array (FPGA) or the like. The processing circuit or the like may comprise one or more processor kernels.

As used herein, the expression "configured to/for" may mean that a processing circuit is configured to, such as adapted to or operative to, by means of software configuration and/or hardware configuration, perform one or more of the actions described herein.

As used herein, the term "action" may refer to an action, a step, an operation, a response, a reaction, an activity or the like. It shall be noted that an action herein may be split into two or more sub-actions as applicable. Moreover, also as applicable, it shall be noted that two or more of the actions described herein may be merged into a single action.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), Secure Digital (SD) card, etc. One or more of the aforementioned examples of computer readable medium may be provided as one or more computer program products.

As used herein, the term "computer readable code units" may be text of a computer program, parts of or an entire binary file representing a computer program in a compiled format or anything there between.

As used herein, the expression "transmit" and "send" are considered to be interchangeable. These expressions include transmission by broadcasting, uni-casting, group-casting and the like. In this context, a transmission by broadcasting may be received and decoded by any authorized device within range. In case of uni-casting, one specifically addressed device may receive and decode the transmission.

In case of group-casting, a group of specifically addressed devices may receive and decode the transmission.

As used herein, the terms "number" and/or "value" may be any kind of digit, such as binary, real, imaginary or rational number or the like. Moreover, "number" and/or "value" may be one or more characters, such as a letter or a string of letters. "Number" and/or "value" may also be represented by a string of bits, i.e. zeros and/or ones.

As used herein, the term "set of" may refer to one or more of something. E.g. a set of devices may refer to one or more devices, a set of parameters may refer to one or more parameters or the like according to the embodiments herein.

As used herein, the expression "in some embodiments" has been used to indicate that the features of the embodiment described may be combined with any other embodiment disclosed herein.

Further, as used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation. The common abbreviation "etc.", which derives from the Latin expression "et cetera" meaning "and other things" or "and so on" may have been used herein to indicate that further features, similar to the ones that have just been enumerated, exist.

Even though embodiments of the various aspects have been described, many different alterations, modifications and the like thereof will become apparent for those skilled in the art. The described embodiments are therefore not intended to limit the scope of the present disclosure.

The invention claimed is:

1. A method, performed by a network node, for providing a Radio Frequency, RF, model of a telecommunications system, wherein the telecommunications system comprises cells, wherein the method comprises:
  configuring, for at least a set of the cells, reporting of call traces indicative of:
  a first type of measurement event relating to serving cell with a first time-to-trigger value and a first threshold value, and
  a second type of measurement event relating to neighbouring cells with respect to the serving cell with a second time-to-trigger value and a second threshold value, wherein the first time-to-trigger value is greater than the second time-to-trigger value, and
  wherein the method further comprises:
  receiving, from each cell of the set, a respective call trace representing a firstly reported measurement event of the first or second type for a connection in said each cell,
  processing, for said each cell of the set, the respective call trace to extract an Reference Signal Received Power "RSRP" for said each cell of the set or to extract a Carrier-To-Interferer ratio "C/I" for said each cell of the set with respect to an interfering neighbouring cell,
  forming a first distribution of RSRP based on the extracted RSRP for said each cell of the set,
  forming a second distribution of C/I based on the extracted C/I, wherein the first and second distributions represent an RF model, and
  sending the RF model to a network management tool for managing performance of the telecommunications system.

2. The method according to claim 1, wherein the first type of measurement event is a measurement event A2.

3. The method according to claim 1, wherein the second type of measurement event is a measurement event A3 or a measurement event A4 or a measurement event A5.

4. The method according to claim 1, wherein the method further comprises:
  obtaining an indication about software releases or capabilities of user equipments in the cells, and
  checking that the indication indicates that at least a specific ratio of the user equipments are capable of being configured with the first and second types of measurement events.

5. The method according to claim 4, wherein the indication is a featureGroupIndicators field, sent by the user equipments during Radio Resource Control procedures for establishing a connection.

6. A network node operable to provide a Radio Frequency, RF, model of a telecommunications system, wherein the telecommunications system comprises cells, wherein the network node comprises a memory and processing circuitry, the processing circuitry configured to:
  configure, for at least a set of the cells, reporting of call traces indicative of:
  a first type of measurement event relating to serving cell with a first time-to-trigger value and a first threshold value, and
  a second type of measurement event relating to neighbouring cells with respect to the serving cell with a second time-to-trigger value and a second threshold value, wherein the first time-to-trigger value is greater than the second time-to-trigger value, and
  wherein the processing circuitry is further configured to:
  receive, from each cell of the set, a respective call trace representing a firstly reported measurement event of the first or second type for a connection in said each cell,
  process, for said each cell of the set, the respective call trace to extract an Reference Signal Received Power "RSRP" for said each cell of the set or to extract a Carrier-To-Interferer ratio "C/I" for said each cell of the set with respect to an interfering neighbouring cell,
  form a first distribution of RSRP based on the extracted RSRP for said each cell of the set,
  form a second distribution of C/I based on the extracted C/I, wherein the first and second distributions represent an RF model, and
  send the RF model to a network management tool for managing performance of the telecommunications system.

7. The network node according to claim 6, wherein the first type of measurement event is a measurement event A2.

8. The network node according to claim 6, wherein the second type of measurement event is a measurement event A3 or a measurement event A4 or a measurement event A5.

9. The network node according to claim 6, wherein the processing circuitry is further configured to:
  obtain an indication about software releases or capabilities of user equipments in the cells, and
  check that the indication indicates that at least a specific ratio of the user equipments are capable of being configured with the first and second types of measurement events.

10. The network node according to claim 9, wherein the indication is a featureGroupIndicators field, sent by the user equipments during Radio Resource Control procedures for establishing a connection.

11. A network node configured for providing a Radio Frequency, RF, model of a telecommunications system, wherein the telecommunications system comprises cells, wherein the network node comprises:
- a configuring module configured for configuring, for at least a set of the cells, reporting of call traces indicative of:
- a first type of measurement event relating to serving cell with a first time-to-trigger value and a first threshold value, and
- a second type of measurement event relating to neighbouring cells with respect to the serving cell with a second time-to-trigger value and a second threshold value, wherein the first time-to-trigger value is greater than the second time-to-trigger value, and wherein the network node further comprises:
- receiving module configured for receiving, from each cell of the set, a respective call trace representing a firstly reported measurement event of the first or second type for a connection in said each cell,
- processing module configured for processing, for said each cell of the set, the respective call trace to extract an Reference Signal Received Power "RSRP" for said each cell of the set or to extract a Carrier-To-Interferer ratio "C/I" for said each cell of the set with respect to an interfering neighbouring cell,
- forming module configured for forming a first distribution of RSRP based on the extracted RSRP for said each cell of the set, wherein the forming module is configured for forming a second distribution of C/I based on the extracted C/I, wherein the first and second distributions represent an RF model, and
- sending module configured for sending the RF model to a network management tool for managing performance of the telecommunications system.

12. The network node according to claim 11, wherein the first type of measurement event is a measurement event A2.

13. The network node according to claim 11, wherein the second type of measurement event is a measurement event A3 or a measurement event A4 or a measurement event A5.

\* \* \* \* \*